(12) United States Patent
Kobayashi et al.

(10) Patent No.: US 6,803,418 B2
(45) Date of Patent: Oct. 12, 2004

(54) THERMOPLASTIC OLEFIN ELASTOMER COMPOSITION

(75) Inventors: Kyoko Kobayashi, Chiba (JP); Yuichi Itou, Chiba (JP); Takayuki Onogi, Chiba (JP); Akira Uchiyama, Chiba (JP)

(73) Assignee: Mitsui Chemicals Inc., Tokyo (JP)

( * ) Notice: Subject to any disclaimer, the term of this patent is extended or adjusted under 35 U.S.C. 154(b) by 0 days.

(21) Appl. No.: 10/276,242

(22) PCT Filed: Mar. 13, 2002

(86) PCT No.: PCT/JP02/02357
§ 371 (c)(1),
(2), (4) Date: Nov. 14, 2002

(87) PCT Pub. No.: WO02/072690
PCT Pub. Date: Sep. 19, 2002

(65) Prior Publication Data
US 2003/0109641 A1 Jun. 12, 2003

(30) Foreign Application Priority Data
Mar. 14, 2001 (JP) .......................................... 2001-72788

(51) Int. Cl.[7] .......................... C08L 23/00; C08L 23/04; C08J 3/24
(52) U.S. Cl. ....................................... 525/191; 525/240
(58) Field of Search ................................. 525/191, 240

(56) References Cited

U.S. PATENT DOCUMENTS

| 4,036,912 A | 7/1977 | Stricharczuk |
| 4,247,661 A | 1/1981 | Herman et al. |
| 4,272,431 A | 6/1981 | Schepers |
| 5,247,018 A | 9/1993 | Maeda et al. |
| 5,608,008 A | 3/1997 | Miyata et al. |
| 5,985,971 A | * 11/1999 | Srinivasan et al. ......... 524/425 |
| 5,998,524 A | * 12/1999 | Srinivasan et al. ......... 524/425 |

FOREIGN PATENT DOCUMENTS

| EP | 1 095 764 A2 | 2/2001 |
| JP | 52-126450 | 10/1977 |
| JP | 7-102126 A | 4/1995 |
| JP | 2001-11246 A | 1/2001 |
| JP | 2001-11247 A | 1/2001 |
| WO | WO 96/06132 A1 | 2/1996 |

* cited by examiner

Primary Examiner—Nathan M. Nutter
(74) Attorney, Agent, or Firm—Birch, Stewart, Kolasch & Birch, LLP

(57) ABSTRACT

The present invention relates to an olefinic thermoplastic elastomer composition obtainable by dynamically heat treating 5 to 50 parts by weight of a polypropylene resin (A) and 50 to 95 parts by weight of an α-olefinic copolymer (B) having a Mooney viscosity $ML_{1+4}$ (100° C.) of 60 to 250 in the absence of a crosslinking agent. The olefinic thermoplastic elastomer composition is characterized in that the glass transition temperature (Tg) in dynamic visco-elasticity measurement derived from the polypropylene resin (A) is lower than that of the polypropylene resin (A) itself and that the α-olefinic copolymer (B) is at least one selected from the following (b-1) and (b-2):

(b-1) ethylene-α-olefinic copolymers which have an ethylene content of 51 to 60 mol % to the total amount of the ethylene-α-olefinic copolymer-constituting ethylene and α-olefin other than ethylene, (b-2) propylene-α-olefinic copolymers which have a propylene content of 60 to 90 mol % to the total amount of the ethylene-α-olefinic copolymer-constituting propylene and α-olefin other than propylene.

4 Claims, No Drawings

THERMOPLASTIC OLEFIN ELASTOMER COMPOSITION

This application is the national phase under 35 U.S.C. § 371 of PCT International Application No. PCT/JP02/02357 which has an International filing date of Mar. 13, 2002, which designated the United States of America.

TECHNICAL FIELD

The present invention relates to an olefinic thermoplastic elastomer composition. More particularly, the present invention relates to an olefinic thermoplastic elastomer composition comprising a polypropylene resin and an α-olefinic copolymer which composition has excellent rubbery elasticity.

BACKGROUND ART

There have heretofore been employed a variety of materials for parts or portions requiring rubbery elasticity in the field of automobile parts, industrial machinery parts, electric and electronic parts, constructional materials and the like. These materials include, for example, vulcanized rubber. Usually, the vulcanized rubber is produced via the vulcanization process wherein a rubber is kneaded with crosslinking agents, crosslinking aids, additives and subsidiary materials to prepare an unvulcanized rubber compound and then is vulcanized with heat. Because of this, it poses a problem that the process is complicated and costs much. Further, the vulcanized rubber cannot be put to recycled use because it is a thermosetting rubber.

Meanwhile, as a material not requiring the vulcanization process but possessing rubber-resembling performances, there is named vinyl chloride resin. Its use, however, is limited since it is inferior in rubbery elasticity to the vulcanized rubber.

Further, as a high molecular weight material which is plasticized at high temperatures and can be molded like plastics and which has rubbery elasticity at ordinary temperatures, there is known a thermoplastic elastomer. As an olefinic thermoplastic elastomer there is known a dynamically crosslinked product of polypropylene and ethylene-α-olefinic copolymer. In this case, too, the dynamic crosslinking process is necessary, thus raising the same problem as mentioned above.

DISCLOSURE OF THE INVENTION

The object of the present invention, which is aimed at solving the problem mentioned above, is to provide an olefinic thermoplastic elastomer composition which can be produced simply by one process in the absence of a crosslinking agent, and with low cost, and which is excellent in rubbery elasticity and in addition easy to be put for recycling.

The present invention includes the following inventions.

(1) An olefinic thermoplastic elastomer composition which is obtainable by dynamically heat treating 5 to 50 parts by weight of a polypropylene resin (A) and 50 to 95 parts by weight of an α-olefinic copolymer (B) having a Mooney viscosity $ML_{1+4}$ (100° C.) of 60 to 250 [the total amount of (A) and (B) being 100 parts by weight] in the absence of a crosslinking agent wherein the glass transition temperature (Tg) in dynamic visco-elasticity measurement derived from the polypropylene resin (A) in the elastomer composition is lower than the glass transition temperature (Tg) of the polypropylene resin (A), and wherein the α-olefinic copolymer (B) is at least one of α-olefinic copolymers selected from the following (b-1) and (b-2):

(b-1) ethylene-α-olefinic copolymers which have an ethylene content of 51 to 60 mol % to the total amount of the copolymer-constituting ethylene and α-olefin other than ethylene, (b-2) propylene-α-olefinic copolymers which have a propylene content of 60 to 90 mol % to the total amount of the copolymer-constituting propylene and α-olefin other than propylene.

(2) An olefinic thermoplastic elastomer composition according to the above (1), wherein the α-olefin other than ethylene that constitutes the ethylene-α-olefinic copolymers of (b-1) is 1-butene and/or 1-octene.

(3) An olefinic thermoplastic elastomer composition according to the above (1), wherein the α-olefin other than propylene that constitutes the propylene-α-olefinic copolymers of (b-2) is ethylene and/or 1-butene.

(4) An olefinic thermoplastic elastomer composition according to any one of the above (1) to (3), which contains 5 to 100 parts by weight of a mineral oil type softening agent to the total 100 parts by weight of the polypropylene resin (A) of 5 to 50 parts by weight and the α-olefinic copolymer (B) of 50 to 95 parts by weight that has a Mooney viscosity $ML_{1+4}$ (100° C.) of 60 to 250 [the total amount of (A) and (B) being 100 parts by weight].

The olefinic thermoplastic elastomer composition of the present invention comprises a polypropylene resin (A) and an α-olefinic copolymer (B) having a Mooney viscosity $ML_{1+4}$ (100° C.) of 60 to 250.

<<Polypropylene Resin (A)>>

As the polypropylene resin (A) employed in the present invention, known polypropylene resins can be used without limitation. Examples thereof are the following polypropylene resins.

1) Propylene homopolymer
2) Random copolymer comprising propylene of 90 or more mol % and other α-olefin of 10 or less mol % (propylene-α-olefin random copolymer)
3) Block copolymer comprising propylene of 70 or more mol % and other α-olefin of 30 or less mol % (propylene-α-olefin block copolymer)

The above-mentioned other α-olefin to be copolymerized with propylene includes, concretely, α-olefins having 2 to 20, preferably 2 to 8 carbon atoms, such as ethylene, 1-butene, 4-methyl-1-pentene, 1-hexene and 1-octene.

One preferred as the polypropylene resin (A) is a propylene homopolymer of the above 1) and a propylene-α-olefin random copolymer of the above 2). Particularly preferred is that having a MFR (ASTM D 1238, 230° C., 2.16 kg load) of 0.1 to 50 g/10 min.

The polypropylene resin (A) can be used alone or in a combination of two or more.

The content of the polypropylene resin (A) in the olefinic thermoplastic elastomer composition of the invention is 5 to 50 parts by weight, preferably 5 to 45 parts by weight, more preferably 5 to 40 parts by weight to the total 100 parts by weight of the polypropylene resin (A) and the α-olefinic copolymer (B) having a Mooney viscosity $ML_{1+4}$ (100° C.) of 60 to 250.

When the content of the polypropylene resin (A) is within the above range, there can be obtained an olefinic thermoplastic elastomer composition which has good rubbery elasticity and gives good appearance with scarce rough surfaces and less adhesiveness.

<< α-olefinic copolymer (B) >>

The α-olefinic copolymer (B) used in the present invention is one that has a Mooney viscosity $ML_{1+4}$ (100° C.) of 60 to 250, preferably 95 to 200, and more preferably 95 to 180.

The above α-olefinic copolymer (B) is at least one α-olefinic copolymer rubber selected from the following (b-1) and (b-2).

(b-1) ethylene-α-olefinic copolymer which has an ethylene content of 51 to 60 mol % to the total amount of the copolymer-constituting ethylene and α-olefin other than ethylene, (b-2) propylene-α-olefinic copolymer which has a propylene content of 60 to 90 mol % to the total amount of the copolymer-constituting propylene and α-olefin other than propylene.

The above α-olefinic copolymers, (b-1) and (b-2), may further have a monomer other than α-olefin in a copolymerised form. As the monomer other than α-olefin, non-conjugated polyenes are enumerated. The α-olefinic copolymer (B) may be a random copolymer or a block copolymer.

The above-mentioned α-olefin includes, concretely, ethylene, propylene, 1-butene, 1-pentene, 4-methyl-1-pentene, 1-hexene and 1-octene. The α-olefin can be used alone or in a combination of two or more.

The α-olefin constituting the above ethylene-α-olefinic copolymer (b-1) is preferably one having 3 to 10 carbon atoms, more preferably 4 to 10 carbon atoms. The α-olefin constituting the above propylene-α-olefinic copolymer (b-2) is preferably one having 2 to 10 carbon atoms other than propylene.

The above non-conjugated polyene includes, for example, dicyclopenetadiene, 1,4-hexadiene, cyclooctadiene, methylenenorbornene and ethylidenenorbornene. The non-conjugated polyene can be used alone or in a combination of two or more. The iodine value of an ethylene-α-olefin-non-conjugated polyene copolymer having such a non-conjugated polyene copolymerised therein is usually 0.1 to 50, preferably 5 to 30.

In the present invention, ethylene-1-butene copolymer, ethylene-1-octene copolymer, propylene-ethylene copolymer and propylene-1-butene copolymer are particularly favorable.

The ethylene content of the above ethylene-α-olefinic copolymer (b-1) (preferably ethylene-1-butene copolymer and ethylene-1-octene copolymer) is 51 to 60 mol %. Herein, the ethylene content means a content per the total amount of all α-olefins (including ethylene).

The propylene content of the above propylene-α-olefinic copolymer (b-2) (preferably propylene-ethylene copolymer and propylene-1-butene copolymer) is 60 to 90 mol %. Herein, the propylene content means a content per the total amount of all α-olefins (including propylene).

When the polypropylene resin (A) is a polypropylene and the α-olefinic copolymer (B) is a propylene-ethylene copolymer, the Mooney viscosity $ML_{1+4}$ (100° C.) of the propylene-ethylene copolymer may be 80 to 250.

The α-olefinic copolymer (B) can be used singly or in a combination of two or more.

The α-olefinic copolymer (B) can be produced by known methods with known catalysts such as metallocene catalyst and vanadium catalyst. For example, an ethylene-α-olefin-non-conjugated polyene copolymer can be produced by a method described in "Polymer Manufacturing Process, issued by Kogyo Chosakai Co., Ltd., pages 309–330".

The content of the α-olefinic copolymer (B) in the olefinic thermoplastic elastomer composition of the invention is 50 to 95, preferably 55 to 95, more preferably 60 to 95 parts by weight to the total 100 parts by weight of the polypropylene resin (A) and the α-olefinic copolymer (B).

The olefinic thermoplastic elastomer composition of the present invention may incorporate, where deemed necessary, additives such as softening agent, heat stabilizer, age resister, weather resister, antistatic, filler, colorant and lubricant within an extent not to damage the object of the present invention.

As the softening agent mentioned above, mineral oil type softening agents are used preferably. Such mineral oil type softening agents suitably used are paraffinic, naphthenic and aromatic softening agents which are usually used for rubber.

When a mineral oil type softening agent is incorporated into the olefinic thermoplastic elastomer composition of the invention, the amount added is preferably 5 to 100 parts by weight, more preferably 5 to 80 parts by weight to the total 100 parts by weight of the polypropylene resin (A) and the α-olefinic copolymer (B).

For the olefinic thermoplastic elastomer composition of the invention to have good rubbery elasticity, it is necessary that the glass transition temperature (Tg), obtained by dynamic visco-elasticity measurement, derived from the polypropylene resin (A) in the elastomer composition is lower than that obtained for the polypropylene resin (A) alone.

The glass transition temperature (Tg) in the present invention is determined from the temperature dependency of Tan δ in dynamic visco-elasticity measurement. The above glass transition temperature (Tg) means a temperature where Tan δ makes the peak. Further, the glass transition temperature (Tg) derived from the polypropylene resin (A) in the olefinic thermoplastic elastomer composition means the glass transition temperature observed upmost in the high temperature side when the measurement is made with components other than the polypropylene resin (A) and α-olefinic copolymer (B) excluded from the elastomer composition.

The means to lower the glass transition temperature (Tg) derived from the polypropylene resin (A) than that of the polypropylene resin (A) alone include the following. For example, when the α-olefinic copolymer (B) is a copolymer of ethylene and an α-olefin having 3 to 10 carbon atoms, the ethylene content in the ethylene-α-olefinic copolymer is decreased. When the α-olefinic copolymer (B) is a copolymer of propylene and an α-olefin having 2 or 4 to 10 carbon atoms, the propylene content in the propylene-α-olefinic copolymer is increased.

Concretely, when the α-olefinic copolymer (B) is an ethylene-1-butene copolymer, it is necessary that the ethylene content is 51 to 60 mol %. When the α-olefinic copolymer (B) is a propylene-α-olefinic copolymer (preferably propylene-ethylene copolymer and propylene-1-butene copolymer) it is necessary that the propylene content is 60 to 90 mol %.

It is also possible to lower the glass transition temperature (Tg) derived from the polypropylene resin (A) than the Tg obtained from the polypropylene resin (A) alone by selection of the kind of comonomer. The comonomer is preferably selected from one that has good compatibility with propylene, and such a comonomer is exemplified by 1-butene.

It is preferable that the olefinic thermoplastic elastomer composition according to the present invention has the characteristics ① and ② mentioned below.

① $9 \leq Y - 0.43X \leq 27$                (1)

preferably $9 \leq Y - 0.43X \leq 26$                (1')

more preferably $$10 \leq Y - 0.43X \leq 26 \quad (1''')$$

[wherein X is a JIS A hardness (unit: none)of the olefinic thermoplastic elastomer composition measured according to JIS K6301 and Y is a compression set (unit: %) of the olefinic thermoplastic elastomer composition measured under the conditions of 70° C.×22 hours according to JIS K6301.]

② To have a permanent elongation of 27% or less, preferably 0.5 to 25%, more preferably 0.5 to 23% when measured according to the prescription of JIS K6301.

The measuring methods of the above characteristics ① and ② are as follows.

JIS A hardness: According to the JIS K6301 prescription, an instantaneous value is measured by a spring hardness tester A model.

Compression set: According to the JIS K6301 prescription, using a cylindrical sample of 12.7 mm thickness and 29.0 mm diameter, a residual strain is measured after the retention under 25% compression and 70° C.×22 hours.

Permanent elongation: According to the JIS K6301 prescription, a JIS No.3 dumbbell is 100% elongated and retained for 10 minutes. A residual strain is measured after ten minutes following removal of the load.

<<Produce of Olefinic Thermoplastic Elastomer Composition>>

The olefinic thermoplastic elastomer composition of the present invention can be produced by dynamically heat treating the above polypropylene resin (A), α-olefinic copolymer (B) and optionally incorporated additives such as softening agent, preferably in a specific proportion mentioned above in the absence of a crosslinking agent.

The above term "dynamically heat treat" means kneading the polypropylene resin (A), α-olefinic copolymer (B) and additives such as softening agent added if needed in a molten state.

The dynamic heat treatment can be effected using a kneading apparatus such as mixing roll, intensive mixer (for example, Bumbury's mixer, kneader), single-screw extruder and twin-screw extruder, wherein preference is given to twin-screw extruder. The dynamic heat treatment is preferably conducted in a non-open type kneading apparatus and preferably conducted under inert gas atmosphere such as nitrogen.

As the conditions upon dynamically heat treating, the kneading temperature is usually 150 to 280° C. and preferably 170 to 240° C., and the kneading time is usually 1 to 20 minutes and preferably 1 to 5 minutes. The shear force applied in the kneading is, in terms of shear rate, usually $10$ to $10^4$ sec$^{-1}$ and preferably $10^2$ to $10^4$ sec$^{-1}$. By the dynamic heat treatment as mentioned above in the absence of a crosslinking agent, there can be obtained an olefinic thermoplastic elastomer composition which is excellent in rubbery elasticity and which gives good appearance when molded.

The olefinic thermoplastic elastomer composition of the invention has superior rubbery elasticity even without crosslinking (vulcanization) using a crosslinking agent and crosslinking aid. Further, the elastomer composition of the present invention is not a thermosetting type elastic material like a conventional vulcanized rubber but is a thermoplastic elastomer, so it is easily put to recycling for reclamation. Furthermore, since the composition is obtainable simply, efficiently by one process of the dynamic heat treatment without a crosslinker, it is inexpensive.

The thus obtained olefinic thermoplastic elastomer composition of the invention can suitably be utilized in the field of interior and exterior parts for automobiles (for example, weather strips and the like), home electric appliances-related parts, earth work/constructional material-related parts (for example, gaskets and the like), sundry goods, daily necessaries and the like.

This specification includes part or all of the contents as disclosed in the specification of Japanese Patent Application No. 2001-72788, which is the base of the priority claim of the present application.

DETAILED DESCRIPTION OF THE PREFERRED EMBODIMENTS

The present invention will be explained hereunder by way of Examples and Comparative Examples, which, however, should not be considered to limit the scope of the invention.

The dynamic visco-elasticity measurement to determine glass transition temperature (Tg) was conducted as in the following.

Using a Dynamic Analyzer (RDS-II) made by Rheometric Inc., Tan δ was measured at a vibrational frequency of 10 Hz and a strain of 1% between −100° C. to 100° C. The temperature at the peak of the Tan δ was determined as a glass transition temperature (Tg). For samples for measurement, a 2 mm thick press sheet was used and cut to strips of 40 mm×10 mm.

EXAMPLE 1

There were blended with a Henschel mixer 30 parts by weight of a propylene-ethylene random copolymer (A-1) (propylene content; 96 mol %, ethylene content; 4 mol %, MFR (ASTM D 1238, 230° C., 2.16 kg load); 0.5 g/10 min.) and 70 parts by weight of an ethylene-1-butene copolymer (B-1) (ethylene content; 51 mol %, 1-butene content; 49 mol %, Mooney viscosity $ML_{1+4}$ (100° C.); 100). Then, using a twin-screw extruder having a L/D of 30 and screw diameter of 50 mm, under nitrogen atmosphere, the blend was dynamically heat treated at 220° C. (kneading time; 2 minutes, maximum shear rate applied in the extruder; 2800 sec$^{-1}$) and extruded to produce pellets of an olefinic thermoplastic elastomer composition. Using an injection molding machine the pellets of this elastomer composition were injection molded into moldings as samples for measuring physical properties, and the measurements of JIS A hardness, compression set (CS) and permanent elongation were conducted. The results are shown in Table 1.

The dynamic visco-elasticity measurements on the propylene-ethylene random copolymer (A-1) and the obtained olefinic thermoplastic elastomer composition were carried out accorging to the above-mentioned method. The Tg of the propylene-ethylene random copolymer (A-1) was 5.5° C., and in contrast with this the Tg derived from the propylene-ethylene random copolymer (A-1) in the obtained olefinic thermoplastic elastomer composition was −6.5° C.

EXAMPLE 2

An olefinic thermoplastic elastomer composition was obtained in the same manner as Example 1, using 30 parts by weight of the propylene-ethylene random copolymer (A-1) which was used in Example 1 and 70 parts by weight of a propylene-ethylene copolymer (B-2) (propylene content; 78 mol %, ethylene content; 22 mol %, Mooney viscosity $ML_{1+4}$ (100° C.); 95). Then, in the same way as Example 1 moldings of the olefinic thermoplastic elastomer composition for measuring the physical properties were injection molded, and JIS A hardness, compression set (CS) and permanent elongation were determined. The results are shown in Table 1.

The dynamic visco-elasticity measurement of the obtained olefinic thermoplastic elastomer composition was conducted according to the above-mentioned method. The Tg derived from propylene-ethylene random copolymer (A-1) in the obtained olefinic thermoplastic elastomer composition was −7.5° C.

EXAMPLE 3

An olefinic thermoplastic elastomer composition was obtained in the same manner as Example 1, using 30 parts by weight of a propylene-ethylene random copolymer (A-1) which was used in Example 1 and 70 parts by weight of a propylene-1-butene copolymer (B-3) (propylene content; 81 mol %, 1-butene content; 19 mol %, Mooney viscosity $ML_{1+4}(100°\ C.)$; 100). Then, in the same way as Example 1 moldings of the olefinic thermoplastic elastomer composition for measuring the physical properties were injection molded to determine JIS A hardness, compression set (CS) and permanent elongation. The results are shown in Table 1.

The dynamic visco-elasticity measurement of the obtained olefinic thermoplastic elastomer composition was conducted according to the above-mentioned method. The Tg derived from propylene-ethylene random copolymer (A-1) in the obtained olefinic thermoplastic elastomer composition was −5° C.

EXAMPLE 4

An olefinic thermoplastic elastomer composition was obtained in the same manner as Example 1, using 30 parts by weight of a propylene-ethylene random copolymer (A-1) which was used in Example 1, 70 parts by weight of an ethylene-1-butene copolymer (B-1) which was used in Example 1 and 20 parts by weight of a mineral oil type softening agent (paraffinic oil made by Idemitsu Kosan Co. Ltd., trade name PW-380). Then, in the same way as Example 1 moldings of the olefinic thermoplastic elastomer composition for measuring the physical properties were injection molded to determine JIS A hardness, compression set (CS) and permanent elongation. The results are shown in Table 1.

The dynamic visco-elasticity measurement of the obtained olefinic thermoplastic elastomer composition was conducted according to the above-mentioned method. The Tg derived from propylene-ethylene random copolymer (A-1) in the obtained olefinic thermoplastic elastomer composition was −8° C.

COMPARATIVE EXAMPLE 1

An olefinic thermoplastic elastomer composition was obtained in the same manner as Example 1, using 70 parts by weight of a propylene-ethylene random copolymer (A-1) and 30 parts by weight of an ethylene-1-butene copolymer (B-1) which both were used in Example 1. Then, in the same way as Example 1 moldings of the olefinic thermoplastic elastomer composition for measuring the physical properties were injection molded, and JIS A hardness, compression set (CS) and permanent elongation were measured. The results are shown in Table 1.

The dynamic visco-elasticity measurement of the obtained olefinic thermoplastic elastomer composition was conducted according to the above-mentioned method. The Tg derived from propylene-ethylene random copolymer (A-1) in the obtained olefinic thermoplastic elastomer composition was 6° C.

EXAMPLE 5, COMPARATIVE EXAMPLES 2–5

Olefinic thermoplastic elastomer compositions were obtained in the same manner as Example 1 except for changing the polypropylene resin (A) and the α-olefinic copolymer rubber (B) as shown in Table 2. The physical properties were evaluated. The results are shown in Table 2.

TABLE 1

|  | Examples | | | | Com. Ex. |
|---|---|---|---|---|---|
|  | 1 | 2 | 3 | 4 | 1 |
| Polypropylene resin A-1 | 30 | 30 | 30 | 30 | 70 |
| α-olefinic copolymer B-1 | 70 |  |  | 70 | 30 |
| B-2 |  | 70 |  |  |  |
| B-3 |  |  | 70 |  |  |
| Paraffinic oil |  |  |  | 20 |  |
| Physical properties JIS A hardness | 71 | 72 | 75 | 66 | 91 |
| Compression set (%) | 55 | 55 | 58 | 51 | 87 |
| Permanent elongation (%) | 18 | 19 | 21 | 15 | 32 |
| Value in the equation (1) *1 | 24.5 | 24.0 | 25.8 | 22.6 | 47.9 |
| Decrease in Tg *2 | 12 | 13 | 10.5 | 13.5 | −0.5 |

(Com.Ex. = Comparative Example)

TABLE 2

|  | Example | Comparative Examples | | | |
|---|---|---|---|---|---|
|  | 5 | 2 | 3 | 4 | 5 |
| Polypropylene resin A-1 | 30 | 30 | 30 | 30 | 30 |
| α-olefinic copolymer B-4 | 70 |  |  |  |  |
| B-5 |  | 70 |  |  |  |
| B-6 |  |  | 70 |  |  |
| B-7 |  |  |  | 70 |  |
| B-8 |  |  |  |  | 70 |
| Physical properties JIS A hardness | 68 | 70 | 70 | 72 | 72 |
| Compression set (%) | 55 | 88 | 85 | 83 | 85 |
| Permanent elongation (%) | 15 | 24 | 22 | 22 | 23 |
| Value in the equation (1) *1 | 26.8 | 57.9 | 54.9 | 52 | 54 |
| Decrease in Tg *2 | 12 | 0.3 | −0.1 | −0.5 | 0.2 |

B-4: Ethylene-octene copolymer (ethylene content; 55 mol %, Mooney viscosity; 95)
B-5: Ethylene-1-butene copolymer (ethylene content; 85 mol %, Mooney viscosity; 90)
B-6: Propylene-ethylene copolymer (propylene content; 55 mol %, Mooney viscosity; 85)
B-7: Propylene-butene copolymer (propylene content; 55 mol %, Mooney viscosity; 95)
B-8: Ethylene-octene copolymer (ethylene content; 75 mol %, Mooney viscosity; 65)
*1 Equation (1): Y-0.43X (wherein X is a JIS A hardness (unit: none) of olefinic thermoplastic elastomer compositions, measured according to JIS K6301 and Y is a compression set (unit: %) of olefinic thermoplastic elastomer compositions, measured under conditions of 70° C. × 22 hours according to JIS K6301.
*2 [Tg of propylene-ethylene random copolymer (A-1)]- [Tg derived from propylene-ethylene random copolymer (A-1) in olefinic thermoplastic elastomer compositions]

All the publications, patents and patent applications cited herein are incorporated herein by reference in their entirety.

Industrial Applicability

The olefinic thermoplastic elastomer composition of the present invention can be produced simply by one process without the use of a crosslinking agent and in a low cost, and it affords excellent rubbery elasticity as well as easy recycling.

What is claimed is:

1. An olefinic thermoplastic elastomer composition produced by a process comprising the step of dynamically heat treating 5 to 50 parts by weight of a polypropylene resin (A) and 50 to 95 parts by weight of an α-olefinic copolymer (B) having a Mooney viscosity $ML_{1+4}$ (100° C.) of 60 to 250 [the total amount of (A) and (B) being 100 parts by weight] in the absence of a crosslinking agent, wherein the glass transition temperature (Tg) in dynamic visco-elasticity measurement derived from the polypropylene resin (A) in the elastomer composition is lower than the glass transition temperature (Tg) of the polypropylene resin (A) alone, and wherein the α-olefinic copolymer (B) is at least one of α-olefinic copolymers selected from the following (b-1) and (b-2):

(b-1) ethylene-α-olefinic copolymers which have an ethylene content of 51 to 60 mol % to the total amount of the propylene-α-olefinic copolymer-constituting ethylene and α-olefin other than ethylene, (b-2) propylene-α-olefinic copolymers which have a propylene content of 60 to 90 mol % to the total amount of the ethylene-α-olefinic copolymer-constituting propylene and α-olefin other than propylene.

2. An olefinic thermoplastic elastomer composition according to claim 1, wherein the α-olefin other than ethylene that constitutes the ethylene-α-olefinic copolymers of (b-1) is 1-butene and/or 1-octene.

3. An olefinic thermoplastic elastomer composition according to claim 1, wherein the α-olefin other than propylene that constitutes the propylene-α-olefinic copolymers of (b-2) is ethylene and/or 1-butene.

4. An olefinic thermoplastic elastomer composition according to any one of claims 1 to 3, which contains 5 to 100 parts by weight of a mineral oil type softening agent to the total 100 parts by weight of the polypropylene resin (A) of 5 to 50 parts by weight and the α-olefinic copolymer (B) of 50 to 95 parts by weight that has a Mooney viscosity $ML_{1+4}$ (100° C.) of 60 to 250 [the total amount of (A) and (B) being 100 parts by weight].

* * * * *